United States Patent
D'Almeida et al.

(10) Patent No.: US 7,921,972 B2
(45) Date of Patent: Apr. 12, 2011

(54) ROTORS OF HIGH POWER ENGINES

(75) Inventors: Oscar D'Almeida, Boulogne Billancourt (FR); Mathias Woydt, Berlin (DE); Jean-Thierry Audren, Saint Remy les Chevreuses (FR)

(73) Assignee: Sagem Defense Securite, Paris (FR)

( * ) Notice: Subject to any disclaimer, the term of this patent is extended or adjusted under 35 U.S.C. 154(b) by 1352 days.

(21) Appl. No.: 11/443,567

(22) Filed: May 30, 2006

(65) Prior Publication Data
US 2010/0247858 A1 Sep. 30, 2010

(30) Foreign Application Priority Data
May 31, 2005 (FR) .................... 05 05474

(51) Int. Cl.
*H02K 7/10* (2006.01)
*F16D 65/12* (2006.01)
(52) U.S. Cl. .................. 188/218 XL; 310/81
(58) Field of Classification Search ............ 188/218 XL, 188/251 M; 310/81, 74
See application file for complete search history.

(56) References Cited

U.S. PATENT DOCUMENTS

| 6,204,590 B1 * | 3/2001 | Audren et al. ........... 310/316.01 |
| 6,888,274 B2 * | 5/2005 | Woydt et al. .................... 310/81 |
| 7,501,742 B2 * | 3/2009 | D'Almeida et al. .......... 310/328 |
| 2004/0156739 A1 * | 8/2004 | Song ............................ 420/528 |

FOREIGN PATENT DOCUMENTS

| EP | 0 136 508 | 4/1985 |
| FR | 2 844 933 | 3/2004 |
| JP | 8-37782 | 2/1996 |

* cited by examiner

*Primary Examiner* — Christopher P Schwartz
(74) *Attorney, Agent, or Firm* — Blakely, Sokoloff, Taylor & Zafman LLP

(57) ABSTRACT

The invention concerns a system, in particular suitable for high power engines, comprising at least a rotor and means comprising active sections fit for making the rotor(s) rotate by their synchronized deformation, characterized in that the rotor material comprises an Al, Fe alloy with at least one other element, the alloy comprising at least more or less 80% in weight of Al and at least between 0.1 and 15.0% in weight in Fe.

15 Claims, 2 Drawing Sheets

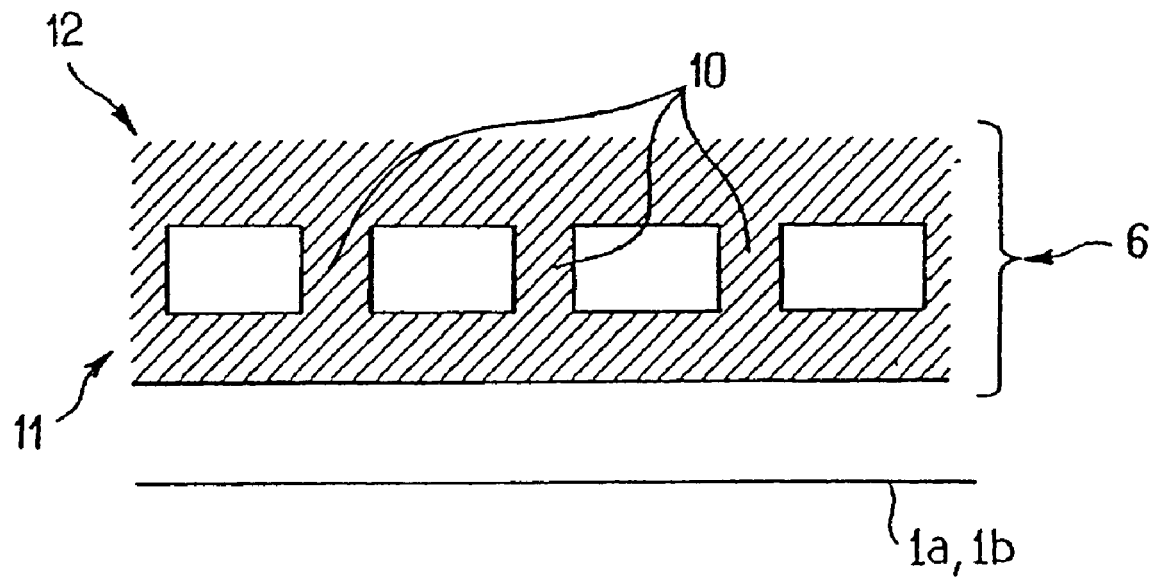
FIG_3
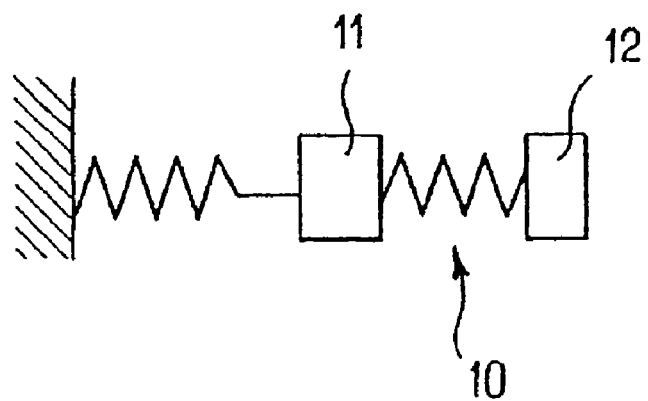
FIG_4

ROTORS OF HIGH POWER ENGINES

GENERAL TECHNICAL DOMAIN

This invention concerns the use of materials in high-power or vibrating engines.

More exactly, it concerns the use of materials for two components in high-power or vibrating engines, the first component (shoe) being in contact by means of dry friction with the second component (rotor) with friction materials at the interface between these two components.

STATE OF THE ART

During operation some high-powered engines use the stretch properties of active materials. These materials, for example, may be materials of the piezo-electric, magnetostrictive, electrostrictive type, etc.

Such engines are known in particular from document FR 2 782 420.

Figure 1:
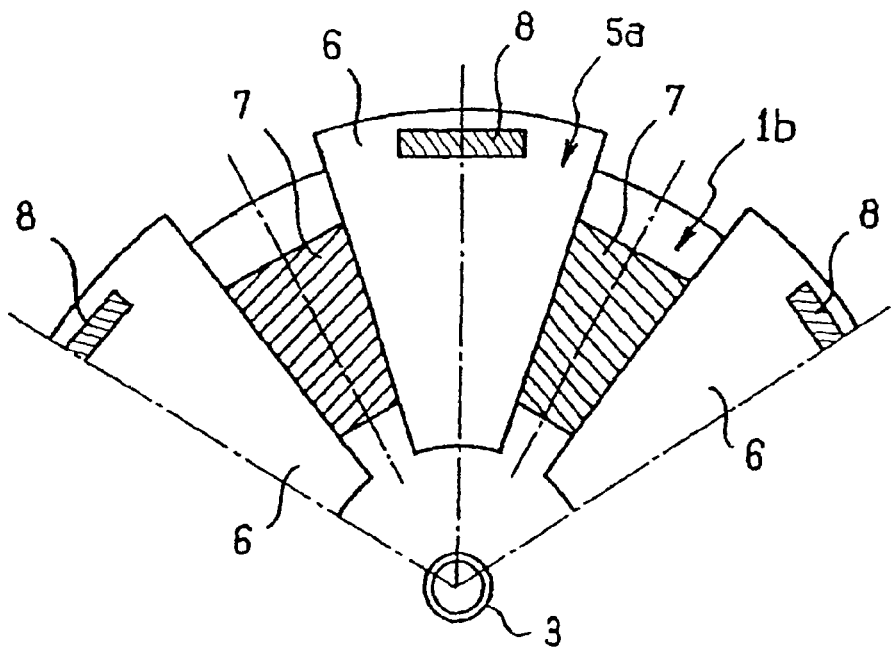
Figure 2:
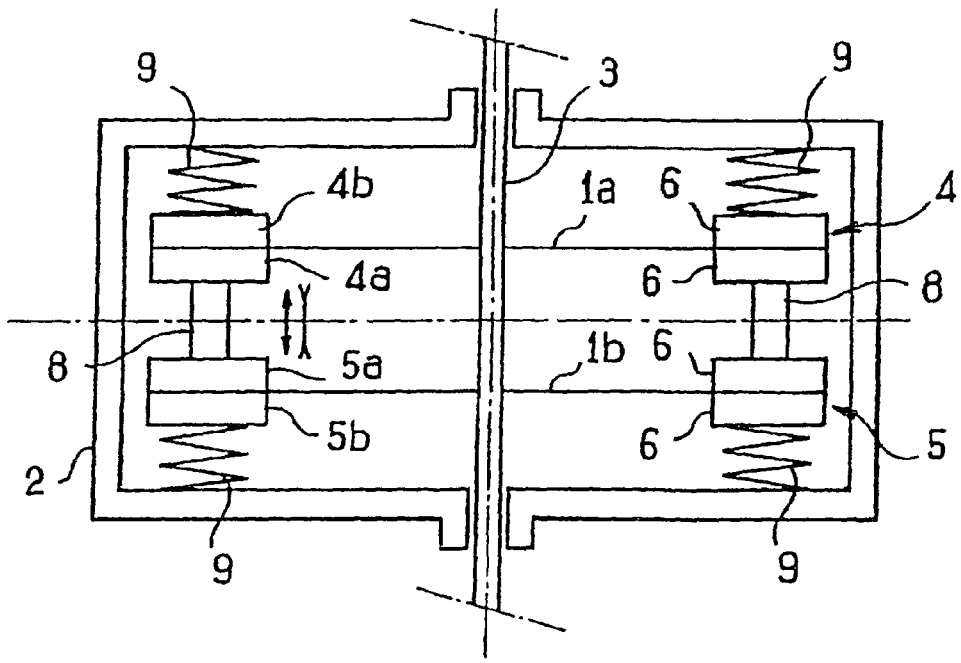

FIGS. 1 and 2 represent in diagram form a known example of a high-power engine 2 comprising blocks 4a, 4b, 5a and 5b more or less circular in shape and two rotors 1a and 1b, one being inserted between blocks 4a and 4b and the other between blocks 5a and 5b.

Rotors 1a and 1b are mounted on a common shaft 3.

Blocks 4a, 4b, 5a and 5b comprise lobes 6 suitable for being put into contact with rotors 1a and 1b.

Blocks 4a, 4b, 5a and 5b comprise components made of active materials 7 inserted between the lobes 6 and which are stretched on the plane of the blocks in order to set the lobes 6 in motion.

The innermost blocks 4a and 5a are interconnected through lobes 6 and by sections 8 made of active materials. These sections are able to strain and displace the lobes 6 in the direction of the arrows shown in FIG. 2.

The outermost blocks 4b and 5b are attached to the engine case 2 by means of lobes 6 and by sections 9 which are spring-loaded.

The synchronised stretching of sections 7 and 8 enables rotors 1a and 1b to be made to rotate, in particular due to the presence of friction between lobes 6 and rotors 1a and 1b.

FIG. 3 shows in diagram form that lobes 6 comprise a main part 12, connected to a contact shoe 11 by intermediate sections 10 which have elastic properties.

The fact that the main part is not directly in contact with the rotors 1a and 1b and that an intermediate part 10 displays flexible straining properties allows the efficiency of the vibrating engine to be increased. In fact, assembly 12, 10 and 11 forms a double spring-loaded assembly shown in FIG. 4.

If the contact shoes 11 are correctly dimensioned, the efficiency of the vibrating engine is greatly increased. Here below in this description, the contact shoes will also be called governors referring to the fact that the shoes represent governors in the double spring-loaded assembly of FIG. 4.

In this way, the governor, which is of limited and fixed mass in order to obtain good operating efficiency from the engine, has a friction layer on its surface which is in contact with a rotor. The thickness of the governor is about 2 mm. As a variation, the governor can collect directly without the presence of a collector layer.

Generally, the intermediate sections 10 have poor thermal conductivity $\lambda$ ($\lambda < 0.5$ W/mK).

Vibrating engines represent an attraction for intermittent actuators, as for example landing gear, cargo door, rudder and flap systems. They are then used to replace hydraulic or pneumatic circuits which require liquids with pour points below $-60°$ C. Now liquids may be inflammable, have to be changed and disposed of correctly. Vibrating motors are also used to replace electric motors using ferrous ferromagnetic materials comprising reduction gearboxes.

Systems which include intermittent actuators need a strong low speed couple.

Application FR 2 819 650 proposes friction couples in linear actuators with very different structure and use from those of high power engines. However, the friction couples of application FR 2 819 650 have stable properties in accordance with operating conditions. Said friction couples are acted upon without slip by flexible crushing of the micro-unevenness. In fact, they are used in locking systems where the aim is to prevent the micro-contact from slipping. They do not have great heat dissipation properties since they do not have to dissipate great quantities of heat induced by the slip phases.

What is more, the total duration of operation of a civil aircraft is about 48,000 flying hours. With regard to the friction materials of the governor and of the rotor of a high power motor, this represents stress equivalent to a total of 2,000 operating hours. It is therefore necessary to have wear rates $k_v$ of less than $3 \times 10^{-8}$ mm$^3$/Nm. It has to be remembered that the rate of wear is used internationally in tribology to describe behaviour during wear. It is defined by the amount of wear divided by the normal load and the slip distance connected with the wear volume. These rates of wear must be independent from the temperature and conditions of use as well as independent from the slip speed. In the same way, for applications in industrial vehicles, even if operating hours are generally limited to 20,000 hours, the total life accumulated is also about 2,000 hours.

It will be realised therefore that the specifications for a high powered engine state low rates of wear and strong friction factors. In addition, friction materials must have thermal properties and in particular, great thermic diffusivity, K [in mm$^2$/s] for the materials especially of the rotor.

In fact, the Curie temperature limits the active effect, in particular the piezo-electric one. In this way, if the temperature rises too much in the high power engine, its operation alters. The constraint of not being able to reach the Curie temperature limits the heating temperature of the governor to about $150°$ C. and that of the rotor to $200°$ C. The rotor can tolerate a higher temperature since it is not connected to heat-sensitive parts, in particular piezo-electric materials and since it is connected to a shaft which constitutes a means of dissipating the heat more rapidly.

The rise in temperature above the Curie temperatures of the piezo-electric materials cannot be neglected in a long-acting application, generating up to several hundred kJoules to be dissipated. Regardless of design and the mode of operation, the materials chosen for the shoes/governors and the rotor must be able to store maximum heat due to loss of friction since cooling of the sections in active materials 7 by ventilation or aeration is not possible.

FR 2 844 933 proposes on the one hand friction materials and friction layers which respond to several constraints at the same time. The materials for the friction layers display:
 good friction properties and low rates of wear;
 good thermal properties;
 a good distribution of the flow of heat;
 good mechanical properties, in particular good fatigue resistance; and
 good anti-corrosion properties.

FR 2 844 933 proposes on the other hand materials for the governors/shoes as well as for the rotor/disc.

With regard to the governors/shoes, the materials proposed by FR 2 844 933 have a specific heat capacity greater than 0.5 [J/g/K]. In particular, preferably it is a matter of:
- MgO-ZrO$_2$,
- zircon-reinforced Aluminium,
- (Ti,Mo)(C,N) with binders with 8-20% in weight of NIMo (TM 8, 10, 20),
- SiSiC,
- WC-6Ni and/or
- AlN.

With regard to the rotor/disc, it is a matter of monolithic materials with a heat capacity greater than 2.5 [J/cm$^3$/K], in particular preferably:
- (Ti, Mo)(C,N) with binders with 8-20% in weight of NiMo (TM 8, 10, 20),
- WC-6Ni,
- AlN,
- SiSiC,
- globular, lamellar and austempered grey cast iron,
- steels (Z6CND16-05-01 and X5CrNiCu15-5),
- Alloys AlSi+SIC/AL$_2$O$_3$,
- Alloys AlSi+dispersoids Al$_4$C$_3$/Al$_2$O$_3$,
- Alloys Al—Fe—V
- Aluminium series 6xxx in T8 and series 7xxx,
- TiAl6V4, DIN 3.7xxx The material for the rotor/disc may be plated with for example:
- magneli phases Ti$_n$O$_{2n-l}$, with 4<n<10, for example 40%Ti$_4$O$_7$/60%Ti$_5$O$_9$),
- 4-6Al$_2$O$_3$/6-4TiO$_2$,
- WC-17%Co,
- (Ti,Mo)(C,N) or (TiW)(C,N) with binders Ni/Mo and/or >75Cr$_3$C$_2$/<25NiCr.

The thermal capacity of the materials for the rotor/disc is not optimum and attempts are being made to improve it further, in particular by a choice of materials which perform better than those revealed in FR 2 844 933.

What is more, some of these materials cannot be used at certain temperatures and in certain instances of stress. For example, the major drawback to the aluminium alloys revealed in FR 2 844 933, such as the 6xxx series in T8 and series 7xxx, as well as AlSi, AlMg and AlZn, whether reinforced or not, is the drop in resistance and fracture due to the temperature. This drop limits the use of these alloys to a maximum temperature of 300° C. or even 250° C. What is more, there is a risk of liquid phases forming from 370° C.

Moreover, FR 2 844 933 only takes into account the distribution of friction heat between the rotor/disc and the shoe. The thermal capacity of the rotor/disc assembly on its shaft is not optimum and attempts are still being made to improve it. FR 2 844 933 does not envisage the structure of such an assembly.

Finally, an engine in a safety system is a system which must always work under any conditions. However, it was ascertained that magneli phases Ti$_n$O$_{2-n}$, with 4≦n≦10, oxidise above 360° C. in the presence of air to give the stoichiometric phase TiO$_2$. This oxidation phenomenon is accelerated when humidity is present.

PRESENTATION OF THE INVENTION

The invention proposes to offset at least one of the drawbacks above mentioned.

For this purpose, the invention proposes a system, in particular appropriate for high power engines, comprising at least a rotor and means comprising active components suitable for making the rotor(s) rotate due to their synchronised deformation, characterised by the fact that the material of the rotor is chosen from among:
- an Al—Fe—V—Si Alloy, with between 0.1 and 15% in weight in Fe, between 0.3 and 15% in weight in V, between 0.1 and 15% in weight in Si, the remainder being Al; and/or
- an Al—Fe—Ce alloy, with between 0.1 and 15% in weight in Fe, between 0.1 and 9% in weight in Ce, the remainder being Al; and/or
- an Al—Fe—Mo Alloy, with between 0.1 and 15% in weight in Fe, between 0.3 and 9% in weight in Mo, the remainder being Al; and/or
- an Al—Yb/Gd-REE (Rare Earth Element) Alloy, with between 1.0 and 20% in weight in Yb or Gd, and between 0.1 and 1.0% in weight in rare earths; and/or
- an Al—Fe—Cr—Ti Alloy, with between 0.5 and 10% in Fe atoms, between 0.4 and 8% in Cr atoms, between 0.3 and 5% in Ti atoms, the remainder being Al; and/or
- an Al—Fe—V alloy, with between 0.1 and 15% in weight in Fe, between 0.1 and 5% in weight in V, the remainder being Al, the alloy comprising fine, homogeneous grains and including a quantity below 0.3% in weight in relation to the total weight of the Mg, Zr, Ce and/or Sr and/or a quantity of less than 0.05% in weight in Ni, the alloy being preferably an Al-12Fe-3V alloy.

The invention is completed to advantage by the following characteristics, taken alone or in their possible combinations:
- the alloy is the 8009Al alloy, namely Al-8.5Fe-1.3V-1.7Si, and/or the alloy Al-8.3Fe-4.0Ce and/or Al-7.0Fe-6.0Ce and/or alloy Al-8Fe-2Mo and/or alloy Al14Yb4Y and/or the alloy Al84.5Fe7Cr6,3T12.5;
- the alloy displays fine, homogeneous grains and has a quantity below 0.3% in weight in relation to the total weight of the alloy of Mg, Zr, Ce and/or Sr and/or a quantity of less than 0.05% in weight of Ni,
- the material comprising each rotor (1a and 1b) is such that it has a thermal capacity greater than 2 [J/cm$^3$/K];
- said means of making the rotor(s) rotate comprises at least a lobe comprising a governor, the material of each governor being such as to have a specific heat capacity (Cp$^{22c}$) greater than 0.35 [J/g/K];
- the material of each governor comprises:
- (Ti,Mo)(C,N) +8-20% Ni/Mo binder (shades TM 8, 10, 20), and/or
- WC-6Ni; and/or
- zircon reinforced aluminium; and/or
- AN, and/or
- silicon carbide infiltrated by silicon SiSiC, with 8-20% in weight in silicon; and/or
- MgO-ZrO$_2$; and/or
- nitride of aluminium obtained by hot sintering HIP-AlN; and/or
- nitride of aluminium obtained under pressure sintering GPS-AlN; and/or
- a magneli phase (Ti$_n$O$_{2n-l}$, 4≦n≦10 with an integer or mixtures of type 40%Ti$_4$O$_7$/60%T$_{i5}$0$_9$), and/or
- globular grey cast iron and/or lamellar grey cast iron and/or austempered and/or alloyed with Cr, Mo, AL, V, Ti ; and/or
- steels (Z6CND16-05-01); and/or
- steels X5CrNiCu15-5; and/or
- alloys AlSi +SiC/AL$_2$O$_3$; and/or
- alloys AlSi +dispersoids Al$_4$C$_3$/Al$_2$O$_3$/TiB$_2$; and/or
- alloys Al—Fe—V; and/or
- aluminium series 6xxx in T6 and above and series 7xxx and/or silicon carbide filtered by silicon SiSiC; and/or titanium alloys, UNS R5xxxx, such as TiAl6V4;

the material of each governor and each rotor is plated with at least one hard layer for heat projection by a material which comprises:

an oxide of an alloy of Ti and Cr, the oxide being in the form of a solid stabilised solution and/or in the form of a solid non-stoichiometric solution, and/or WC-17%Co, and/or (Ti,Mo)(C,N) or (Ti,W)(C,N) +a binder Ni/Mo; and/or >75$Cr_3C_2$/<25NiCr; and/or 4-6$Al_2O_3$/6-4$TiO_2$.

The solid stabilised solution of the oxide of the Ti and Cr alloy manifests itself in the form of $Ti_{n-2}Cr_2O_{2n-1}$, with $6 \leq n \leq 9$ and/or in which the non-stoichiometric form of the oxide of the alloy of Ti and Cr manifests itself in the form of a solid solution of $TiO_2$ and $Cr_2O_3$, preferably in a form chosen from among: $Cr_2Ti_2O_7$, $Ti_6Cr_2O_{15}$, $Ti_7Cr_2O_{17}$, $Cr_2Ti_8O_1$, $Cr_2Ti_5O_{13}$, $Cr_2Ti_4O_{11}$, $Cr_{0.12}Ti_{0.75}O_{1.74}$, $Cr_{0.222}Ti_{0.778}O_{1.889}$, $Cr_{0.286}Ti_{0.714}O_{1.857}$ or $Cr_{0.46}Ti_{0.54}O_{1.77}$.

The hard layers deposited by thermal projection show final rugosity of $R_a$ (arithmetic rugosity) of less than 0.04 μm, the thickness of the layers machined being greater than 50 μm and/or in which the values of rugosity $R_{pk}$ and $R_{vk}$ of standard DIN EN ISO 13565-2: 1998 are less than 0.030 μm and 0.070 μm respectively;

the rotor and a shaft of the rotor are a single unit and comprise the same material;

a protective case for the engine is connected to the shaft and comprises the same material as the rotor.

The invention displays numerous advantages.

The capacity of the rotor/disc is improved by the fact of the choice of material having great thermal capacity and good thermal conduction.

The thermal conduction capacity of the rotor/disc is further improved by the thermal conduction towards the engine shaft (even towards the case), which itself is of sufficient thermic mass to store the loss of friction.

The improvement in the thermal capacity of the rotor/disc on the one hand and of the rotor/disc assembly plus shaft (even carter) on the other, made possible by the use of alloys with high thermal diffusivity K [$mm^2/s$], such as aluminium alloys, affords better protection for those sections made of active materials 7 and consequently greater safety and longer engine life.

What is more, the use of materials according to the invention allows the engine parts to be manufactured more easily and economically.

Finally, the invention permits use of the engine over a greater range of stress, temperatures and humidity.

PRESENTATION OF THE FIGURES

Other characteristics, aims and advantages of the invention will emerge from the description here below which is purely illustrative and not exhaustive and which must be read opposite the figures attached on which FIG. 1, already explained, represents in diagram form an elevation of a high power engine;

FIG. 2, already explained, represents in diagram form the profile of a high power engine;

FIG. 3, already explained, represents in diagram form the cross section of a lobe in a vibrating engine; and FIG. 4, already explained, represents in diagram form the spring assembly system comprising the lobe of FIG. 3.

DETAILED DESCRIPTION OF THE INVENTION

Generation and Absorption of Heat

The generation of heat is very important in a high power engine, due to the dry friction between its components. For example, a high power engine with mechanical power of 5 kW produces a friction loss of about 4.5 kW. Since the engine is not lubricated, all friction loss is transformed into heat. The heat generated must be stored by the materials in contact.

What is more, generally engines have a limitation to their power to mass ratio. This ratio is usually equal to 1 kW per kg. In this way, the engine does not have much mass in order to be able to absorb the friction heat generated.

Heat Distribution

The invention aims at improving the distribution of heat among the various components of the high power engine.

It has to be remembered that the thermic diffusivity K [in $mm^2/s$] is the determinant factor in this distribution.

The heat generated during engine operation is distributed among the surfaces of the "governor-rotor" tribo-component.

It has to be remembered that the volume of the rotor is fixed by design. On the other hand, only the mass of the governor is fixed by design, for example, at 10 grams each for an engine output power of 5 kW.

In this way, a heat of 220,000 Joules is for example generated with a friction loss of 4.5 kW during an actuating time of less than 50 seconds. It is also possible to obtain an identical heat value for a sequence of multiple actuations lasting a few seconds.

The distribution of heat among the various surfaces of the tribo-component depends first of all on the ratio of the two surfaces in contact.

The ratio of the rubbing surfaces between, for example, a structure with 32 governors (17,176 $mm^2$) and for example the two sides of two rotors (50,990 $mm^2$) of a high power engine, is about 1:2.96.

In order to calculate the distribution of the flow of heat from rubbing q generated in the tribo-contact of the two sliding components, the following formula (1) may be applied because the two surfaces are not very different from each other:

$$\frac{q_{1governor}}{q_{2rotors}} = \frac{\sqrt{\rho_1 \lambda_1 C_{p1}}}{\sqrt{\rho_2 \lambda_2 C_{p2}}} \quad (1)$$

where ρ represents the density of the material considered, λ the thermal conductivity and $C_p$ the mass thermal capacity.

This formula (1) is valid for two tribo-components having more or less the same surface in contact and having heat flows q such as:

$$q_{rotor} + q_{govenor} = 1$$

The formula (1) shows that the distribution of heat depends as a priority on the thermal properties of the materials, such as conductivity, specific heat capacity and the volumetric density of the rubbing materials. It has to be remembered in addition that these properties depend on temperature.

Heat Dissipation

After the friction loss has been distributed among the high power motor components, its dissipation becomes important.

It has to be remembered that a large quantity of heat is generated at the interface between the governor and disc. Each governor is near active materials and/or glue which are all heat sensitive. For example, the glue will be of the polyimide type which has a glass transition temperature of about 150° C. In this way a material is required for the governor which has at the same time poor thermal conductivity and great specific heat. The poor thermal conductivity allows a minimum of heat generated at the interface to be attracted to the governor. The great specific heat allows maximum heat to be stored which would have been transmitted to the governor just the same. If the governor materials have the above mentioned properties, then it is possible to limit their temperature to the one set, namely 150° C.

In this way, in order to dissipate for example 220, 000 Joules among the rotors and governors of an engine, it is possible to choose the governors made of the materials foreseen by FR 2 844 933 and recorded in the first part of this description.

The heat dissipated among all the governors must not exceed their thermal capacity, so that the equation (2) is satisfied.

$$Q_{governors} \geq Q_{frictional}\left(\frac{q_{governors}}{q_{discs} + q_{governors}}\right) \quad (2)$$

Where $Q_{frictional}$ is the heat generated by rubbing and $Q_{governors}$ is the thermal capacity for all the governors.

For the rotor, the situation is the opposite to that of the governor. Each governor has a defined weight (10 grams with ±10% for example). On the other hand, only the volume of the rotor is defined by design.

The rotor/disc is not connected to heat sensitive components. Consequently, for the disc, a material is required which has both great thermal conductivity and great specific heat. The great thermic conductivity allows a maximum amount of heat generated at the interface to be attracted to the disc. The great specific heat allows the maximum amount of this heat transmitted to the disc to be stored.

The inventors have remarked that the alloys of Al, Fe and at least one other element (the alloys are consequently noted as AlFeXY, where X and Y represent different elements), including at least more or less 80% in weight of Al and at least between 0.1 and 15.0% in weight of Fe, had interesting properties with regard to thermal conductivity and thermal and heat capacity, recorded in table 1. All the thermal capacity values shown in Table 1 are for rotors with a diameter of 179 mm×5 mm (with therefore an approximate volume of 125.8 cm³ but a variable thickness however, of between 4 and 7 mm approximately) where ΔT=200 K. Knowing the variation in temperature ΔT allows the absolute value to be obtained of the amount of heat absorbed [kJ/dm³] by a material. Table 1 gives a value of 495 kJ/dm³. This quantity or capacity of heat accumulation must be considered as a volumetric value because the space available for a rotor is independent of the material and densities vary a great deal from one alloy to another.

TABLE 1

| Materials | Density [g/cm³] | Thermal conductivity [W/mK] | Thermal capacity [kJ/kg] (kJ/dm³) | Volumic heat capacity [J/cm³/K] | Maximum operation [° C.] | Specific heat capacity [J/g/K] |
|---|---|---|---|---|---|---|
| AlFeXY | 3.02 | 100 | 164 (495) | 2.72 | 500 | 0.9 (1.1 à 500° C.) |

These interesting properties are due in particular to the fact that aluminium has a diffusivity of between 70 and 80 mm²/s. By way of comparison grey cast iron has a diffusivity of between 10 and 15 mm²/s, TiAl6V4 has a diffusivity of between 2.9 and 3.2 mm²/s and Inconel 718 has a diffusivity of between 2.5 and 2.9 mm²/s.

The type of aluminium alloy mentioned above has thermal capacities complementary to those of the governors.

More exactly, the Al, Fe alloy and at least one other element are chosen from:
- an Al—Fe—V—Si alloy, with between 0.1 and 15% in weight in Fe, between 0.3 and 15% in weight in V, between 0.1 and 5% in weight in Si, the remainder being Al, the alloy being preferably alloy 8009Al, namely Al-8.5Fe-1.3V-1.7Si; and/or
- an Al—Fe—Ce alloy, with between 0.1 and 15% in weight in Fe, between 0.1 and 9% in weight in Ce, the remainder being Al, the alloy being preferably alloy Al-8.3Fe-4.0Ce and/or Al-7.0Fe-6.0Ce; and/or
- an Al—Fe—V alloy, with between 0.1 and 15% in weight in Fe, between 0.1 and 5% in weight in V, the remainder being Al, the alloy being preferably AL-12Fe-3V ; and/or
- an Al—Fe—Mo alloy, with between 0.1 and 15% in weight in Fe, between 0.3 and 9% in weight in Mo, the remainder being Al, the alloy being preferably Al-8Fe-2Mo ; and/or
- an AL-Fe—Cr—Ti alloy, with between 0.5 and 10% of Fe atoms, between 0.4 and 8% of Cr atoms, between 0.3 and 5% of Ti atoms, the remainder being Al, the alloy being preferably Al84.5Fe7Cr6,3Ti2.5;
- an Al—Yb/Gd-REE (Rare Earth Element) alloy, with between 1.0 and 20% in weight of Yb or Gd and between 0.1 and 1.0% in weight in rare earths, the alloy being preferably Al14Yb4Y.

The man skilled in the art knows that there are several possible manufacturing procedures for an alloy. Therefore, it is possible to form the above mentioned alloys by rapid solidification or atomisation followed by wiredrawing, in order to achieve breaking-strength at room temperature of up to 1,600 MPa with amorphous or partially amorphous aluminium matrixes (crystalline amorphous mixture).

However, these procedures are hardly suitable for the manufacture of large tonnages and the manufacture of complex parts necessary for an automobile or aeronautic application. What is more, the breaking-strength of alloys produced by rapid solidification is reduced after annealing above a recrystallisation temperature, generally above 300-350° C.

This invention proposes making the rotor/disc in an aluminium alloy as stated above by gravity die casting under pressure, followed by de-embrittlement in a vacuum in a mould preheated between 350-650° C. This manufacturing procedure may be adapted to the manufacture of large tonnages and complex parts necessary in automobile or aeronautic applications.

As a variation, it is possible to make the rotor/disc with the above mentioned alloy by casting in a strip followed by rolling and cutting. This variation offers the advantage of a reduction in machining allowance on the parts (by way of comparison, this machining allowance is usually necessary for cast iron parts) and reduces accordingly the need for machining the part which reduces machine cuttings, the value of which in monetary terms should be taken into account with regard to aluminium alloy.

The use of materials in accordance with the invention allows engine parts to be produced more simply and economically.

Another advantage of making the parts as castings is that the "rotor-shaft" may be monoblock. In this way, the fact that the rotor plus shaft is a single part facilitates the transfer of heat from the rotor to the shaft which itself has a thermal mass capable of storing the friction loss. Therefore, the thermal capacity of the rotor/disc is further improved by heat conduction towards the engine shaft which is also made of a material which has great thermal capacity. The casting of the disc and shaft in aluminium alloy as a monoblock is a great advantage which avoids assembly of the two parts and does not disturb the flow of heat from the disc/rotor towards the shaft. It is possible to improve this efficiency further by making the engine case of the same aluminium alloy and by connecting it to the shaft.

Preferably, the above mentioned aluminium alloys may, just before casting, be subjected to a grain-size reduction and standardization stage by adding to the alloy a quantity of less than 0.3% in weight in relation to the overall weight of the composition, of Mg, Zr Ce and/or Sr (inoculation) and/or a quantity of less than 0.05% in weight of nickel.

For engine applications and compared to grey cast iron, these modified aluminium alloys show, even if produced only as castings and castings in strips, good hot breaking-strength (T<500° C.). Their breaking-strength is in fact comparable to that of grey cast iron with 3.7% in weight in [C], namely $R^{500°\,C.}_m$~100 MPa and $R^{500°\,C.}_{0.02}$~40 MPa. What is more, for these alloys there is no formation of liquid phases at a melting point below 600° C., as is the case in Al—Si—Mg—Zn systems.

The inventors have also discovered that the elastic modulus of alloy Al84.5Fe7Cr6Ti2.5 produced by gravity die casting gives a Young E modulus with the values:

at room temperature $E^{RT}$=104.1 GPa; and at 500° C. $E^{500°\,C.}$=83 GPa comparable to grey cast iron with 3.7% in weight of [C]. It is ascertained that these values are clearly greater (~44% at room temperature) than those of the aluminium alloys disclosed in FR 2 844 933 (67-74 GPa of alloys Al—Si, Al—Mg, Al—Zn—Mg, Al—Cu, for example).

Gravity die casting of Al8.5Fe1.3V1.7Si has a Young E modulus with the values:

$E^{RT}$=85.7 GPa; and $E^{500°\,C.}$=65 GPa.

These results are obtained without the use of particles, trichites or ceramic fibres.

Modified aluminium alloys in an engine application show an intrinsic gain in rigidity and hot breaking-resistance combined with an operational temperature going up to 500° C. Obviously, this represents a strong technical advantage but also a cost-related one.

It is highly preferable that the friction materials of the governors and/or of the rotor/disc are plated with a material which affords an increase in hardness. The material is applied preferably as plating by thermal projection or is glued onto the monolithic governor and/or the rotor/disc as advocated by FR 2 844 933.

The inventors found that with regard to the oxides of a Ti and Cr alloy, since the oxides were in the form of a stabilised solid solution and/or in the form of a non-stoichiometric solid solution, they did not present the disadvantage of oxidation as did the materials of FR 2 844 933. This oxidation phenomenon is in fact present in magneli phases $Ti_nO_{2n-1}$, with $4 \leq n \leq 10$ for example.

The solid stabilised solution of the oxide of the Ti and Cr alloy manifests itself preferably in the form $Ti_{n-2}Cr_2O_{2n-1}$ with $6 \leq n \leq 9$.

The non-stoichiometric form of the oxide of the Ti and Cr alloy is manifest preferably in the form of a solid $TiO_2$ and $Cr_2O_3$ solution. It is highly preferable for the said solid solution to be in a form chosen from among: $Cr_2Ti_2O_7$, $Ti_6Cr_2O_{15}$, $Ti_7Cr_2O_{17}$, $Cr_2Ti_8O_1$, $Cr_2Ti_5O_{13}$, $Cr_2Ti_4O_{11}$, $Cr_{0.12}Ti_{0.78}O_{1.74}$, $Cr_{0.222}Ti_{0.778}O_{1.889}$, $Cr_{0.286}Ti_{0.714}O_{1.857}$ or $Cr_{0.46}Ti_{0.54}O_{1.77}$.

"Stick" or "Slip" Microcontact

The contact of the tribo-system of the high power engine carries out an elliptical rotary movement with a slip pressure and speed evolution.

Likewise, the material for each governor and rotor is plated by thermal projection in a material which comprises:

WC-17% Co; and/or (Ti,Mo) (C, N) or (Ti, W) (C,N) plus an Ni/Mo binder; and/or

>75$Cr_3C_2$/<25NiCr; and/or 4-6$Al_2O_3$/6-4$TiO_2$.

The movement breaks down into two phases: a "outward run" phase with slip and pseudo-stick. During this phase, the pressure reaches the maximum (12 MPa for a COF of 0.2) at a relatively slow speed (0.5 m/s maximum, then a tendency towards 0). This phase corresponds to a transmission of power or of torque.

The other phase is the "return" phase where the slip speed reaches the maximum (about 2.5 m/s) in the opposite direction to the previous one or counter to the rotor rotation direction. During this phase, the pressure drops to about 2 PMa. The total duration of the cycle is 50 µs.

Table 2 shows the section of 20 kHz 50 µs cycle in several periods of operation which are called "phases".

This section was made for an engine with a mechanical power of 5 kW.

The section of a cycle in accordance with table 2 shows two modes of contact for the displacement of the micro-unevenness on the surface of the materials. First of all, the contact may be made according to a flexible deflection of the unevenness (here called "stick" in the Anglo Saxon terminology generally used by the man skilled in the art). Secondly, contact may take place according to total "sliding" or "slip" (according to the Anglo Saxon terminology generally used by the man skilled in the art).

TABLE 2

| Quantity | Outward run | | | Return | | |
|---|---|---|---|---|---|---|
| | Phase 1 | Phase 2 | Phase 3 | Phase 4 | Phase 5 | Phase 6 |
| Average P [MPa] | 9 | 11 | 8 | 5 | 2 | 2 |
| Average slip speed [m/s] | 0.37 | 0.012 | 0.064 | −0.0065 | −1 | −1.66 |
| Relative displacement [µm] | 3.92 | 0.106 | 0.422 | 0.001 | 10.8 | 19.3 |
| Mode of movement | slip | stick | stick | stick | slip | slip |
| phase duration [µs] | 10.6 | 8.8 | 6.6 | 1.6 | 10.8 | 11.6 |
| Slip distance during Outward run and Return of a wave [µm] | | 4.45 | | | 30.1 | |
| Average slip speed [m/s] | | 0.17 | | | −1.25 | |
| Heat loss for COF = 0.30 [W/mm²] | 0.11 | 0.039 | 0.15 | <0.01 | 0.6 | <1.2 |

For displacements of less than 0.42 µm, the micro-unevenness sticks and does not slip. It is resistant to fatigue since it is stressed elastically. In this case of an elastic response to the micro-unevenness without slip, or in the stick mode, the dissipated friction energy is zero. The slight loss is to be found at the level of a slight anelastic loss in the deformation of the micro-unevenness.

The return of the governor during the second phase of the cycle takes place with heat density at the rate of about 1 W/mm², while remaining below this value with slip speeds of about 1.7 m/s, while remaining below this value.

In order to stress the micro-rugosity well elastically and without breaking off contact, since this behaviour is typical of the condition of "polished" surfaces, the bending radius of the micro-unevenness must be "big". Such a bending radius is obtained by machining. At high slip speeds (in the region of 1.66 m/s), the tribo-system will "automatically run itself in". It will present a surface condition with a particular functional rugosity. The bending radii of the unevenness have values determined by speed. In this way, machining allows a topography to be obtained which is predetermined by tests on engines. The (hard) layers deposited by thermal projection must be machined towards final rugosity of Ra (arithmetic rugosity) of less than 0.04 µm. This rugosity allows abrasive action to be eliminated and to minimise "running in" (in accordance with the Anglo Saxon terminology generally used). Preferably, since the coating has porosity of between 1% and 4% in volume, rugosity values $R_{pK}$ and $R_{vK}$ (defined in accordance with standard DIN EN ISO 13565-2:1988) must be less than 0.030 µm and 0.070 µm respectively. The thickness of the layers machined (functional thickness) deposited by thermal projection is greater than 50 µm and preferably greater than 200 µm.

The developments stated above are therefore applicable to the stick contact mode combined with a slip speed in the region of about 1.25 m/s.

Determination of the topographical values of the rubbing surfaces after tests in a real engine is the only method for reducing the rate of initial wear. Therefore, if the unevenness is stressed elastically, the topography remains invariant over time.

Special Case of High Power Engines

What is set out here below is applicable to advantage in cases of high power engines producing quantities of heat of 220,000 Joules during actuation of a 5 kW high power engine.

All the characteristics which the friction materials must display are resumed in what is set out here below.

Tribological Properties

The materials or coatings must have a static and dynamic rubbing factor of between 0.2 and 0.8, in particular they may have a preferred value of between 0.5 and 0.8.

What is more, they must show rates of wear $K_v$ greater than $1\times10^{-8}$ mm³/Nm for a quantity of heat Q equal to 220,000 Joules with 2,000 hours of life accumulated.

Therefore these values are:

invariant with the relative humidity;

invariant at the temperature which may be up to 200° C.; and invariant at nominal contact pressure P below 12 MPa The values of COF and of wear rates must never be less than the minimum values in accordance with the temperature, pressure and relative humidity.

What is more, the couples must not show adhesion wear mechanism.

In addition, the static COFs are greater than the dynamic COFs.

Mechanical Properties

The materials or coatings must have a fatigue limit of up to $1.4\times10^{11}$ cycles for 2,000 hours accumulated.

The materials or coatings must have a shearing-strength at the interface of the plating which has a value greater than 12 MPa.

Thermal Properties

The first points dealt with here below define the fact that it is desirable to limit the temperature of the governor and of the rotor.

Case of the Governor (Constant Mass)

It must have a specific heat capacity $Cp^{22c}$ above 0.35 [J/g/K] and preferably above or equal to 0.5 [J/g/K].

Alternatively, preferably, for a temperature increase of $\Delta T=150K$, it must have a specific heat capacity $Cp^{22c}$ greater than 52.5 [J/g]. These values are derived from FR 2 844 933.

It is to be noted that in the relatively near future, developments in the active materials, in particular piezo-electric ones, will without doubt allow higher Curie temperatures.

Case of the Rotor (Constant Volume)

If the rotor is designed in order to be able to accumulate maximum heat, then it must have a heat capacity above 2 [J/cm³K] or 400 [J/cm³/K], for $\Delta T=200K$. Preferably, it will be greater than or equal to 2.5 [J/cm³K], or 500 [J/cm³] for $\Delta T=200K$. With the materials of this invention, table 1 gives a value of 2.72 [J/cm³/K].

The previous conditions on the governors and rotors are alternatives. They may also preferably be cumulative, whereby the governors and rotors then verify one of the previous conditions respectively.

If on the other hand the rotor is designed in order to minimise its weight, then the ratio heat capacity/rotor weight must be greater than 70 [J/g] for an increase in temperature of $\Delta T=200K$.

The following point defines the fact that it is desirable for the governor to have maximum heat accumulation capacity.

Diffusivity Ratios

The friction heat dissipated in the governor assembly must not exceed the heat capacity of the governors $Q_{governors}$ for $\Delta T=150$ K while satisfying the equation (2).

The last point defines the fact that it is desirable to minimise the temperature of the governor.

Distribution Ratio of the Heat Flow

The temperature of the governor is minimised by maximising the distribution ratio of the flow of heat towards the rotor, whereby this distribution satisfies the equation (1).

Corrosion Resistance

All materials and layers of coating must be resistant in the long-term, or corrosion and damp-proof. They may also have passivation properties.

The invention claimed is:

1. A system suited to high power engines, comprising at least a rotor and means comprising active sections suitable for making rotate the rotor(s) due to their synchronised deformation, wherein the material of the rotor is composed of at least one of the materials taken from the group consisting of:
    an Al—Fe—V—Si alloy, with between 0.1 and 15% in weight in Fe, between 0.3 and 15% in weight in V, between 0.1 and 5% in weight in Si, the remainder being Al, and
    an Al—Fe—Ce alloy, with between 0.1 and 15% in weight in Fe, between 0.1 and 9% in weight in Ce, the remainder being Al; and
    an Al—Fe—Mo alloy, with between 0.1 and 15% in weight in Fe, between 0.3 and 9% in weight in Mo, the remainder being Al; and
    an Al—Fe—Cr—Ti alloy with between 0.5 and 10% atoms of Fe, between 0.4 and 8% atoms of Cr, between 0.3 and 5% atoms of Ti, the remainder being Al, and
    an Al—Fe—V alloy with between 0.1 and 15% in weight in Fe, between 0.1 and 5% in weight in V, the remainder being Al,
    the alloy comprising fine homogeneous grains and comprising at least one of the quantities taken from the group consisting of
    less than 0.3% in weight in relation to the overall weight of at least one of the materials taken from the group consisting of Mg, Zr, Ce and Sr, and less than 0.05% in weight of Ni.

2. A system according to claim 1, in which the said means for making the rotor(s) rotate comprises at least a lobe comprising a governor, the material of each governor being such that it has a specific thermal capacity greater than 0.35 [J/g/K].

3. A system according to claim 2, in which the material of each governor and of each rotor is plated with at least a hard thermal projection layer in at least a material taken from the group consisting of:
    an oxide of an alloy of Ti and of Cr, the oxide being in the form taken from the group consisting of a solid stabilised solution and a non-stoichiometric solid solution, and
    WC-17%Co, and
    (Ti,Mo)(C,N), and
    (Ti,W)(C,N)+a Ni/Mo binder; and
    >75$Cr_3C_2$/<25NiCr; and
    4-6$Al_2O_3$/6-4$TiO_2$.

4. A system according to claim 3, in which the solid stabilised solution of the oxide of the Ti and Cr alloy is in at least one of the forms taken from the group consisting of
    $Ti_{n-2}Cr_2O_{2n-1}$ with 6<n<9, and
    non-stoichiometric solid solution of $TiO_2$ and $Cr_2O_3$.

5. A system according to claim 4, wherein the solid solution is in one of the forms taken from the group consisting of $Cr_2Ti_2O_7$, $Ti_6Cr_2O_{15}$, $Ti_7Cr_2O_{17}$, $Cr_2Ti_8O_1$, $Cr_2Ti_8O_{13}$, $Cr_2Ti_4O_{11}$, $Cr_{0.12}Ti_{0.78}O_{1.74}$, $Cr_{0.222}Ti_{0.778}O_{1.889}$, $Cr_{0.286}Ti_{0.714}O_{1.857}$ and $Cr_{0.46}Ti_{0.54}O_{1.77}$.

6. A system according to claim 3 or claim 4, in which the values of the rugosity $R_{pK}$ and $R_{vk}$ of standard DIN EN ISO 13565-2: 1998 are below 0.030 μm and 0.070 μm respectively.

7. A system according to claim 3 or claim 4, in which
    the hard layers deposited by thermal projection show final rugosity of $R_a$ below 0.04 μm, and
    the thickness of the layers machined being greater than 50 μm.

8. A system according to claim 2, in which the material of each governor comprises at least one of the materials taken from the group consisting of:
    (Ti,Mo)(C,N)+8-20% of binder Ni/Mo, and
    WC-6Ni, and
    zircon-reinforced aluminium, and
    AlN; and
    silicon carbide infiltrated with silicon SiSiC, with 8-20% in weight in silicon; and
    MgO-$ZrO_2$, and
    zircon-reinforced aluminium; and
    aluminium nitride obtained by hot sintering; and
    aluminium nitride obtained under pressure sintering; and
    a $Ti_nO_{2n-1}$ magneli phase, with 4<n<10 with n being an integer, and
    a 40%$Ti_4O_7$/60%$Ti_5O_9$ mixture of magneli phases, and
    a globular grey cast iron, and
    a grey lamellar cast iron, and
    an austempered cast iron, and
    a cast iron allied with Cr, Mo, Al, V, or Ti; and
    a Z6CND16-05-01 steel; and
    a X5CrNiCu15-5 steel; and
    an AlSi +SiC/$Al_2O_3$ alloy; and
    an AlSi +dispersoids $Al_4C_3$/$Al_2O_3$/$TiB_2$ alloy; and
    an Al—Fe—V alloy; and
    a 6xxx aluminium series, in T6 and higher, and
    a 7xxx aluminium series; and
    silicon carbide infiltrated with silicon SiSiC; and
    a titanium alloy.

9. A system according to claim 8, wherein the titanium alloy is TiAl6V4.

10. A system according to claim 1, in which the rotor and a rotor rotation shaft form a monoblock and comprise the same material.

11. A system according to claim 10, in which an engine protection case is connected to the rotation shaft and comprises the same material as the rotor.

12. A system according to claim 1, wherein the Al—Fe—V alloy is Al-12Fe-3V.

13. A system according to claim 1, in which the alloy is composed of at least one of the materials taken from a group consisting of Al-8.5Fe-1.3V-1.7Si, and Al-8.3Fe-4.0Ce, and Al-7.0Fe-6.0Ce, and Al-8Fe-2Mo, and Al-14Yb-4Y, and Al-84,5Fe-7Cr-6.3Ti-2.5.

14. A system according to claim 1, in which the alloy has fine homogeneous grains and comprises at least one of the quantities taken from the group consisting of less than 0.3% in weight in relation to the overall weight of at least one of the materials taken from the group consisting of Mg, Zr, Ce and Sr, and less than 0.05% in weight of Ni.

15. A system according to claim 1, in which the material of each rotor is such that it has a thermal capacity greater than 2 $[J/cm^3/K]$.

\* \* \* \* \*